Sept. 2, 1958 O. C. FROM ET AL 2,850,655
TELEPHONE RINGING GENERATOR
Filed March 25, 1955 2 Sheets-Sheet 1
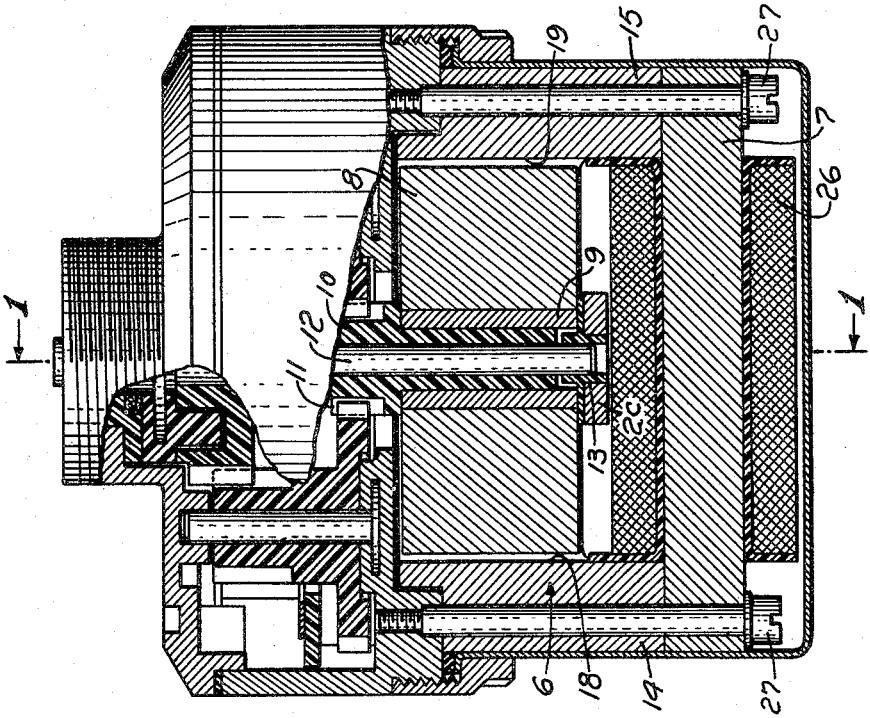
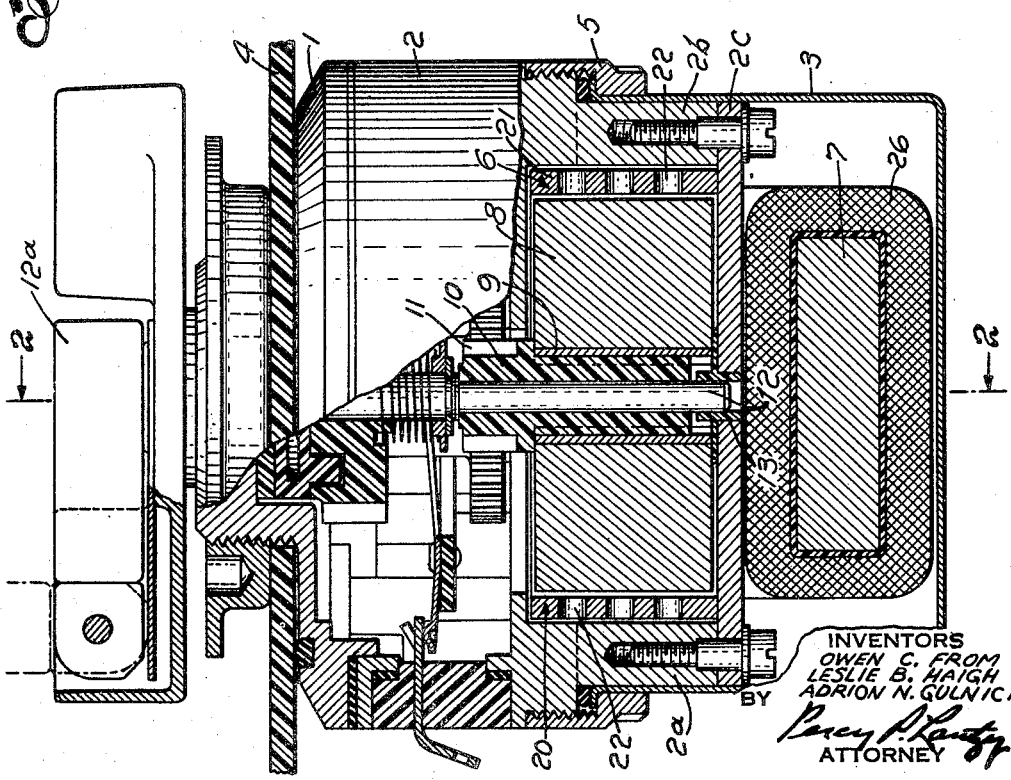
INVENTORS
OWEN C. FROM
LESLIE B. HAIGH
ADRION N. GULNICK
BY
ATTORNEY Sept. 2, 1958 O. C. FROM ET AL 2,850,655
TELEPHONE RINGING GENERATOR
Filed March 25, 1955 2 Sheets-Sheet 2
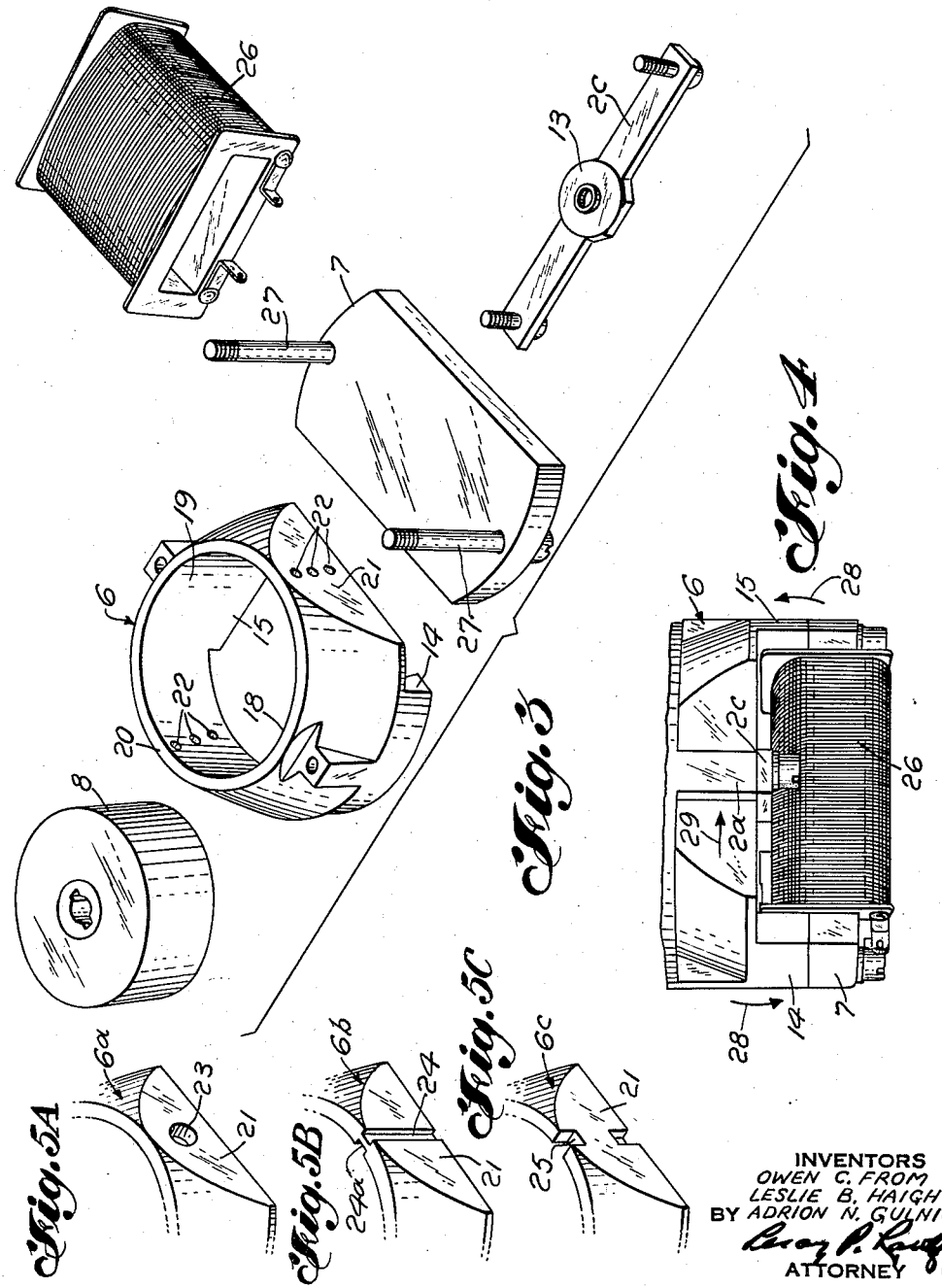
INVENTORS
OWEN C. FROM
LESLIE B. HAIGH
BY ADRION N. GULNICK
ATTORNEY United States Patent Office 2,850,655
Patented Sept. 2, 1958

2,850,655

TELEPHONE RINGING GENERATOR

Owen C. From, East Orange, Leslie B. Haigh, West Orange, and Adrion N. Gulnick, Palisades Park, N. J., assignors to International Telephone and Telegraph Corporation, Nutley, N. J., a corporation of Maryland Application March 25, 1955, Serial No. 496,674

5 Claims. (Cl. 310—190)

This invention relates to a generator of the type used to produce ringing current at a telephone subscriber's set, and more particularly, to the construction and form of the stator portion of the generator and method of making same.

In generators of this type heretofore known, the output waveform is uneven and is characterized by objectionable high peak voltages and high static starting torques. Furthermore, use of laminated material in the magnetic circuit complicates the manufacturing process and increases cost of production.

We have discovered that iron powder compacts such as Sinteel M-201 now available in the open market may, with advantage, be used in the magnetic circuit of ringing generators. Such compacts are made of iron and silicon powder, compressed, sintered and/or coined and annealed, the resulting compacts having a desired density in the range of about 80–85%, wherein 100% density is 7.85 grams of iron per cubic centimeter. The silicon comprises about 3% of the mixture to minimize the eddy current losses. The use of this material in a stator enables us to more easily build a unitary bipolar structure which eliminates troublesome laminations and results in certain improved operating characteristics.

An object of this invention therefore is to provide by use of iron compacts a generator of improved design which is relatively simple in construction and less costly than the laminated type of generator to manufacture.

Another object of this invention is to provide an improved stator for generators, including a unitary bipolar structure, and a method of making same.

Further objects and advantages of this invention, will become more apparent by reference to the following description and accompanying drawings wherein:

Fig. 1 is an elevation view partially in section taken along the lines 1—1, Fig. 2;

Fig. 2 is an elevation view partially in section taken along the lines 2—2, Fig. 1;

Fig. 3 is an exploded view of the magnetic structure of the generator;

Fig. 4 is a partial view of an assembly of the magnetic structure of the generator; and Figs. 5A, 5B and 5C are partial views of modifications of the link structure between the pole portions of the stator.

In the embodiment of our invention illustrated in Figs. 1 to 4 of the drawings, we have shown a bipolar generator of the permanent magnet rotor type. However, a great many variations from this embodiment may be made without departing from the scope of our invention.

With reference to the drawings and in particular Figs. 1 and 2, the generator of our invention is mounted within a substantially cylindrical moisture-proof shell comprising housing elements 1, 2 and 3. The element 1 is an end closure adapted to be mounted on a panel 4. The central element 2 is joined to the other end element 3 by a ring 5. The central housing element 2 contains the driving mechanism the shaft 12 of which passes through the end housing element 1 and has connected thereto a crank handle 12a. For detailed information of the driving mechanism, reference may be had to the copending application of G. F. McCarthy and A. N. Gulnick (3–2) Serial No. 500,506 of April 11, 1955, now Patent No. 2,771,562. The element 2 includes two side extensions 2a and 2b which extends into the housing element 3, and has connected thereto a bearing member 2c.

The housing element 3 also encloses a stator portion which includes the bipolar magnetic structure 6 and a coil core 7. A permanent magnet rotor 8 is encompassed by the bipolar structure 6. The rotor 8 comprises a cylinder of magnetizable material having a high degree of retentivity and is permanently magnetized. Cast Alnico VI, as made by Indiana Steel Products Company, Valparaiso, Indiana, has been found to be a suitable material for this purpose. The rotor is provided with a soft metal center 9 having longitudinal slots fitted on a nylon sleeve bearing 10 terminated in a gear 11. This rotor unit is rotatably mounted on a shaft 12, one end of which is supported in a nylon bearing 13 carried by an end plate 2c. With the exception of the Alnico rotor and the magnetic stator structure, the assembly is preferably made up of non-magnetic material.

The bipolar structure 6 is pressure molded as a unitary body, the material preferred being Sinteel M-201 or its equivalent comprising a mixture of iron and silicon powders, wherein the silicon content is approximately 3% of the mix to minimize eddy current losses.

This material is first compressed to the desired shape, then sintered, and depending upon the density desired it may also be coined and annealed. The compacting pressure is preferably in the order of 25 t. s. i. (tons per square inch). The sintering temperature is usually about 2100° F. although this may be varied if the article is to be also coined and annealed. A coining pressure of approximately 50 t. s. i. and an annealing temperature of from about 1400 to 1700° F. may be employed. Sintering and annealing are preferably performed in a reducing atmosphere for about one hour depending upon the size of the unit being prepared. While densities up to about 80-85% may be had by sintering, only, coining and annealing may also be used to obtain these and higher densities.

The unitary bipolar structure 6, Fig. 3, is in the form of a hollow cylindrical body adapted to encompass the rotor axially thereof, the body having two extensions 14 and 15 and two opposed pole portions 18 and 19 interconnected by two metallic flux links 20 and 21. The pole portions and the links are arcuate along the inner surfaces thereof while the outer surfaces of the pole portions are tapered axially of the body to eliminate unnecessary material and weight and the links are flattened thereby restricting each of the interconnecting links in cross-sectional area which is further reduced to a predetermined value by cut-outs 22. The links 19 and 20 are preferably maintained at sufficient thickness during processing to avoid breakage, the links after sintering and/or annealing being further reduced in cross section by any one of several possible cut-outs. Where danger of breaking during handling is reduced, the link portions may be molded directly to the minimum cross-sectional area or permeance desired in the finished stator. The cut-outs, for example, may be a single centrally disposed opening 23, Fig. 5A, a row of holes 22 arranged crosswise of the link axially of the body 6, Fig. 3, one or more grooves such as 24 and 24a may be disposed crosswise of the link, Fig. 5B, or a notch 25 may be made in one or both edges of the link, Fig. 5C. The notches 25 or grooves 24 and 24a need not be rectangular but may be V-shaped or U-shaped or any other shape that may be desired.

The coil core 7 is formed of Sinteel M-201 or its equivalent into a flat rectangular bar easily received axially of a prewound field coil 26. The core bridges across extensions 14 and 15 of the unitary bipolar structure 6 and both the core and the bipolar structure 6 are attached to the housing element 2 by screws 27.

The pole portions 18 and 19 are interconnected by flux links 20 and 21 which provide a novel form of magnetic shunt to assist in limiting output voltage at high rotor speed and in reducing the static starting torque of the generator. The flux from the pole portion 18 divides into parallel paths through the flux links 20 and 21 and through the core 7, as indicated by arrows 29 and 28 respectively, in inverse proportion to the reluctances of the link and core paths. As rotor speed is increased, the increasing magnetic field induced by the coil as a result of coil current acts to oppose the flow of flux through core 7 from the rotor 8 and in effect acts to increase the reluctance of the path through the core. The reluctance ratio of the core 7 to the links 20 and 21 is therefore progressively diminished as the rotor speed is increased and an increasing portion of the rotor flux is diverted through the shunts so as to limit the rate of voltage increase with increase in rotor speed.

It is well known that a permanent magnet loses a part of its magnetism if the magnetic circuit is opened. With the unitary bipolar structure 6 the flux links 20 and 21 act at all times as a magnet keeper to maintain the magnetization. Consequently, the coil core 7 may be removed for replacement or repairs without affecting the characteristics of the permanent magnet rotor.

In the operation of the generator described, when the rotor is set in motion, an alternating flow of flux is present in the core 7 and it induces a voltage in the winding 26. The induced voltage is, of course, dependent upon the rate of change of the flux linking the winding.

From the foregoing description it will be clear that we have provided an improved generator having a relatively low starting torque and a smoother turning torque. It will also be apparent that the unitary bipolar structure is relatively easy to manufacture and to assemble with other parts of the generator. The unitary feature of the bipolar structure is also important since there is no need for adjusting and aligning of poles as required in other generators heretofore proposed. Further, the flux links 20 and 21 provide not only for reducing the static starting torque but also function as a permanent keeper for the magnetic rotor.

While we have described above the principles of our invention in connection with specific apparatus, it is to be clearly understood that this description is made only by way of example and not as a limitation to the scope of our invention.

We claim:

1. A magneto generator comprising a permanent magnet rotor having an axis of rotation, a unitary bipolar stator structure having the form of an integral hollow cylinder body, said stator body being composed of a sintered mixture of iron and silicon, said stator body adapted to encompass the rotor about the axis thereof, said stator body having two opposed pole portions interconnected at their circumferential extremities by two link portions, said pole portions having relatively unlimited flux permeance, said link portions having limited flux permeance to provide a first flux path between said pole portions of a limited flux permeance, a coil, a core composed of a sintered mixture of iron and silicon adapted to have said coil wrapped thereon and means coupling said core to said stator body across said pole portions to provide a second flux path through said core between said pole portions having a relatively unlimited flux permeance.

2. A magneto generator comprising a permanent magnet rotor, a unitary bipolar stator structure having the form of an integral hollow cylindrical body, said stator body being composed of a sintered mixture of iron and silicon, said rotor adapted to be disposed for rotation within said stator body, said stator body having two opposed pole portions interconnected at their circumferential extremities by two link portions, said pole and link portions each having inner surfaces of arcuate shape, said link portions having a minimum cross-sectional area at the central portion thereof to provide a flux path between said pole portions of limited flux permeance, a coil, a core composed of a sintered mixture of iron and silicon adapted to have said coil wrapped thereon, and means coupling said core to said stator body across said pole portions to produce a second flux path through said core between said pole portions having a relatively unrestricted flux permeance.

3. A magneto generator comprising a permanent magnet rotor, a unitary bipolar stator structure having the form of an integral hollow cylindrical body, said stator body being composed of a sintered mixture of iron and silicon, said rotor adapted to be disposed for rotation within said stator body, said stator body having two opposed pole portions interconnected at their circumferential extremities by two link portions, said pole and link portions each having inner surfaces of arcuate shape, said link portions having flattened outer surfaces to provide a flux path between said pole portions of limited flux permeance, a coil, a core composed of a sintered mixture of iron and siilcon adapted to have said coil wrapped thereon, and means coupling said core to said stator body across said pole portions to produce a second flux path through said core between said pole portions having a relatively unrestricted flux permeance.

4. A magneto generator comprising a permanent magnet rotor having an axis of rotation, a unitary bipolar stator structure having the form of an integral hollow cylinder body, said stator body being composed of a sintered mixture of iron and silicon, said stator body adapted to encompass the rotor about the axis thereof, said stator body having two opposed pole portions interconnected at their circumferential extremities by two link portions, said pole portions having relatively unlimited flux permeance, said link portions including cut outs therefrom to limit the flux permeance to provide a first flux path between said pole portions of a limited flux permeance, a coil, a core composed of a sintered mixture of iron and silicon adapted to have said coil wrapped thereon and means coupling said core to said stator body across said pole portions to provide a second flux path through said core between said pole portions having a relatively unlimited flux permeance.

5. A magneto generator comprising a permanent magnet rotor having an axis of rotation, a unitary bipolar stator structure having the form of an integral hollow cylinder body, said stator body being composed of a sintered mixture of iron and silicon, said body having a density in the range of 80-85%, of 7.85 grams of iron per cubic centimeter, said silicon portion comprising 3% of said mixture, said stator body adapted to encompass the rotor about the axis thereof, said stator body having two opposed pole portions interconnected at their circumferential extremities by two link portions, said pole portions having relatively unlimited flux permeance, said link portions including cut outs therefrom to limit the flux permeance to provide a first flux path between said pole portions of a limited flux permeance, a coil, a core composed of a sintered mixture of iron and silicon adapted to have said coil wrapped thereon and means coupling said core to said stator body across said pole portions to provide a second flux path through said core between said pole portions having a relatively unlimited flux permeance.

(References on following page)

References Cited in the file of this patent

UNITED STATES PATENTS

| | | |
|---|---|---|
| 1,798,571 | Walther | Mar. 31, 1931 |
| 1,897,068 | Morton | Feb. 14, 1933 |
| 2,187,180 | Schweitzer | Jan. 16, 1940 |
| 2,287,902 | Puchy | June 30, 1942 |
| 2,387,073 | Horlacher | Oct. 16, 1945 |
| 2,482,526 | Watson | Sept. 20, 1949 |
| 2,598,623 | Vacha | May 27, 1952 |
| 2,758,231 | Welter | Aug. 7, 1956 |

FOREIGN PATENTS

| | | |
|---|---|---|
| 525,026 | Great Britain | Aug. 20, 1940 |